United States Patent [19]
McLean

[11] 3,841,643
[45] Oct. 15, 1974

[54] SEAL FOR BEARINGS AND SIMILAR ROTATING MEMBERS
[76] Inventor: Neil J. McLean, Rt. 3, Box 467B, Plymouth, Ind. 46563
[22] Filed: Jan. 21, 1972
[21] Appl. No.: 219,656

[52] U.S. Cl. .................................................. 277/57
[51] Int. Cl. ......................... F16j 15/40, F16j 15/48
[58] Field of Search .................. 277/57, 56, 55, 53; 285/DIG. 19

[56] References Cited
UNITED STATES PATENTS
1,672,013  6/1928  Vroom .................................. 277/57
FOREIGN PATENTS OR APPLICATIONS
82,753  1/1957  Denmark ..................... 285/DIG. 19
394,606  6/1933  Great Britain ........................ 277/57
115,768  10/1944  Sweden ................................. 277/57

Primary Examiner—Louis R. Prince
Assistant Examiner—Robert I. Smith
Attorney, Agent, or Firm—Oltsch & Knoblock

[57]  ABSTRACT

A seal for use between revolving components. A seal part is carried by each of the components. The seal parts are juxtaposed and have overlapping faces which cooperate to define a continuous slot between the overlapping faces. A flexible strip is loosely positioned within the slot with the ends of the strip overlapping.

7 Claims, 4 Drawing Figures

PATENTED OCT 15 1974 3,841,643
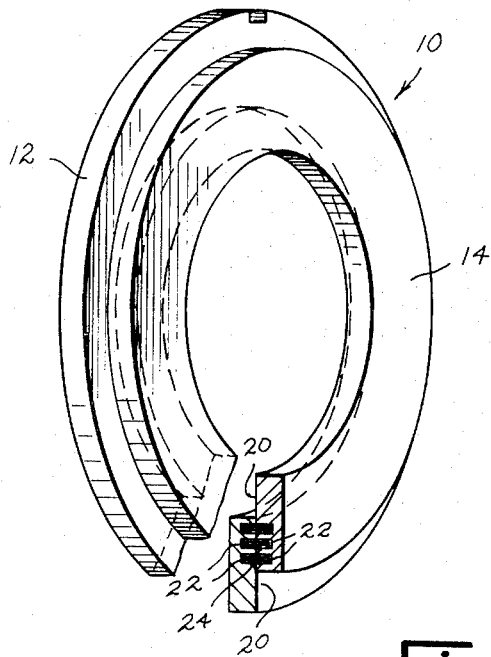
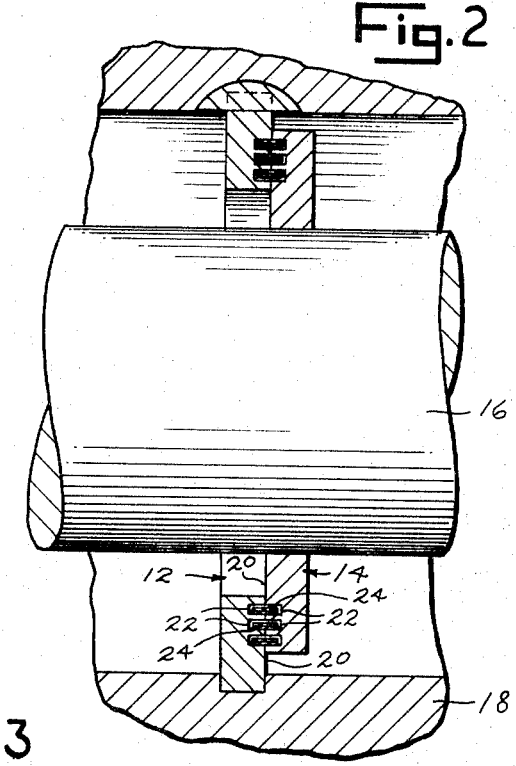
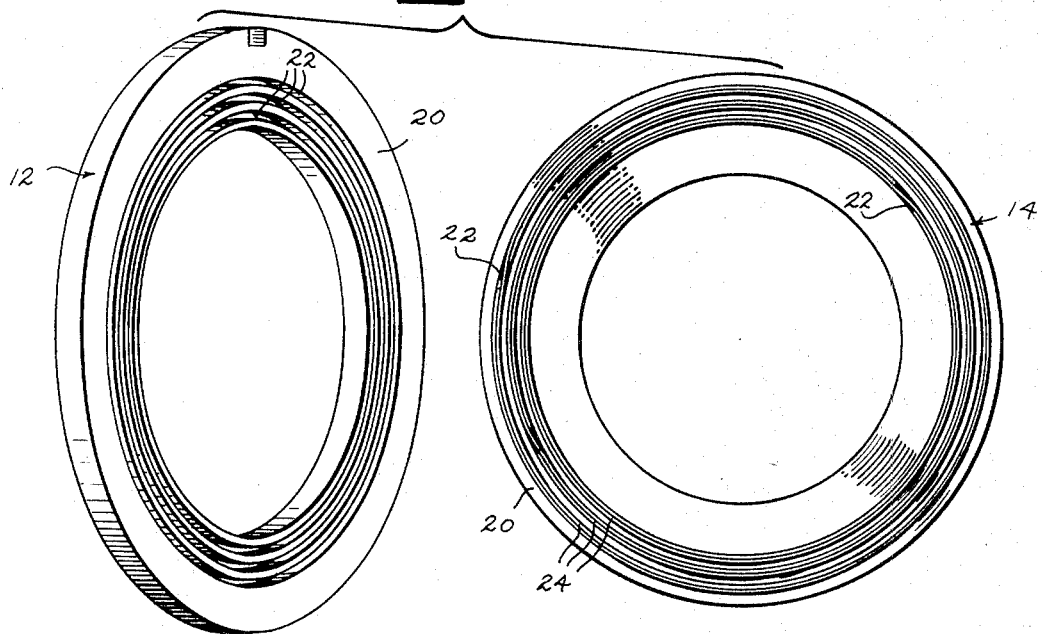
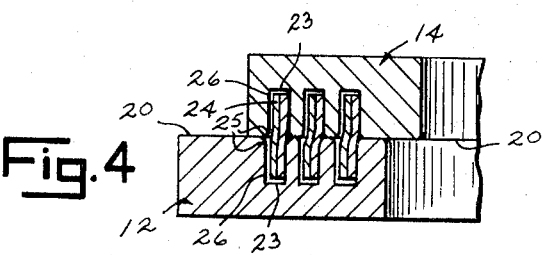

SEAL FOR BEARINGS AND SIMILAR ROTATING MEMBERS

SUMMARY OF THE INVENTION

This invention relates to a seal for use between revolving parts and will have particular application to bearing seals.

The seal of this invention includes first and second seal parts. The first seal part is secured to one component and the second seal part is secured to the other component of a pair of components which experience relative revolving movement. The seal parts have confronting continuous faces with at least one of the faces being shiftable over the other face during revolving movement of the components. The face of the first seal part has a continuous groove formed therein. The face of the second seal part includes means which cooperate with the groove in the first seal part to form a continuous slot between the faces of the seal parts. An elongated flexible strip is fitted loosely within and extends entirely around the slot between the seal part faces. The strip has overlapping ends and a width which is sufficient to overlap portions of both seal parts in all operative positions of the components.

The seal of this invention can be economically manufactured and will provide a suitable barrier in both positive pressure and vacuum environments. While this seal will have principal application in the bearing seal art for rotatable shafts, it is to be understood that the seal can be utilized between various rotating objects, such as an endless conveyor belt and its housing.

Accordingly, it is an object of this invention to provide a seal for use between components experiencing relative rotating movement.

Another object of this invention is to provide a bearing seal having one part connected to a shaft and another part connected to the housing for the shaft with at least one flexible strip fitted within a continuous slot encircling the shaft and formed between confronting faces of the seal parts.

Another object of this invention is to provide a seal for rotating members which is of economical construction and which would have application in either vacuum or positive pressure environments.

Other objects of this invention will become apparent upon a reading of the invention's description.

BRIEF DESCRIPTION OF THE DRAWING

A preferred embodiment of this invention has been chosen for purposes of illustration and description wherein:

FIG. 1 is a perspective view of the embodiment having portions thereof broken away for purposes of illustration.

FIG. 2 is a sectional view of the seal of FIG. 1 shown connected between a rotating shaft and its housing.

FIG. 3 is a perspective view showing the components of the seal of FIG. 1 in exploded form.

FIG. 4 is an enlarged fragmentary detailed cross sectional view of the seal of FIG. 1 showing the component parts thereof in slight misalignment.

DESCRIPTION OF THE PREFERRED EMBODIMENT

The preferred embodiment illustrated is not intended to be exhaustive or to limit the invention to the precise form disclosed. It is chosen and described in order to best explain the invention and its application and practical use to thereby enable others skilled in the art to best utilize the invention.

The illustrated seal of this invention is designated by the reference numeral 10 and includes ring parts 12 and 14 which encircle shaft 16. Ring part 14 of seal 10 is secured to shaft 16, preferably by a press fit, for rotation with the shaft. Ring part 12 encircles shaft 16 with clearance and is secured to housing 18 in a suitable manner, such as by the groove and key arrangement illustrated in FIG. 2. Ring parts 12 and 14 overlap at confronting faces 20. Each face 20 of ring parts 12 and 14 have at least one and preferably a plurality of continuous grooves 22 formed therein. Grooves 20 are circular in configuration and coaxial with the axis of revolution of shaft 16. Each groove 22 in ring part 12 is oppositely positioned from a similar groove 22 in ring part 14 and defines with that groove a continuous annular slot.

An elongated strip 24 is fitted within each slot formed by opposed grooves 22. Strip 24 extends entirely around the slot and has its end portions overlapping. The amount of overlap of the end portions of each strip 24 can vary depending upon the material from which the strip and ring parts are constructed and the particular application for which the seal is used. Each strip 24 overlaps a portion of both ring parts 12 and 14 and has a width which does not exceed the depth of the slot as measured between the bases 23 of the opposed grooves 22. Each strip 24 fits loosely within its slot so as to allow for its diametrical expansion or contraction within the slot depending upon whether the seal is subjected to a positive or negative pressure gradient. To facilitate rotative movement between seal parts 12 and 14 and the expansion and contraction of the strip within the seal parts, it is preferable that each strip be constructed of a low friction material, such as Teflon.

In FIG. 4, opposed grooves 22 of seal ring parts 12 and 14 are shown in slight misalignment. The intersection 25 of each groove side wall 26 with the face 20 of the groove-defining ring part is rounded so as to facilitate flexure of strip 24, as illustrated, when positioned within the groove with the ring parts in misalignment. In this manner seal 10 can be constructed to accommodate misalignment between the revolving parts, such as shaft 16 and its housing 18 to which it is secured.

Rotation of shaft 16 within housing 18 causes ring part 14 to revolve relative to ring part 12. Strips 24, in conjunction with the ring parts, form a labyrinth which prevents the passage of material, such as air, liquid, or fine particulate matter, through the seal.

It is to be understood that the invention is not to be limited to the details herein given, but may be modified within the scope of the appended claims.

What I claim is:

1. A seal for use between components experiencing relative revolving movement comprising a first seal part adapted to be secured to one of the components and a second seal part adapted to be secured to the other of the components, said seal parts having confronting continuous faces with at least one face being shiftable over the other face during revolving movement of said components, the face of the first seal part having a continuous groove formed therein, the face of said second seal part including means cooperating with said groove to form a continuous slot between said faces, an elongated flexible strip positioned loosely between each of said seal parts and fitting within and extending entirely around said slot, said strip having overlapping ends and a width sufficient to overlap portions of said first and second seal parts in all operative positions of the seal.

2. A seal for use between a housing and a shaft extending through said housing, wherein one of said shaft and housing experiences rotative movement relative to the other of the shaft and housing, comprising a pair of rings each adapted to encircle said shaft, one ring adapted for securement to the shaft and the other ring adapted for securement to the housing, said rings overlapping and having confronting continuous faces, one said face having a continuous groove formed therein, the other said face including means cooperating with said groove to form a continuous slot between said faces and encircling said shaft, an elongated flexible strip fitting loosely between each of said rings within and extending entirely around said slot, said strip having overlapping ends and a width sufficient to overlap a portion of each ring in all operative positions of said seal upon rotative movement of said one shaft or housing.

3. The seal of claim 2 wherein said cooperating means of the other said face is a continuous groove positioned oppositely of the groove in the one said face and defining said slot.

4. The seal of claim 3 wherein each groove includes side walls and a base, the width of said strip exceeding the depth of each groove as measured from the face of each ring to the base of the groove therein but being less than the distance between the bases of said grooves.

5. The seal of claim 4 wherein the junction of the face of each ring and each side wall of the groove therein is of a rounded configuration to facilitate flexure of the strip upon misalignment of said grooves.

6. The seal of claim 3 wherein said faces have a plurality of oppositely positioned continuous grooves formed therein defining at least one other continuous slot, a said flexible strip fitting loosely within each slot.

7. The seal of claim 6 wherein said slots are circular and coaxial with the axis of rotation of said one shaft or housing.

* * * * *